United States Patent [19]
Ballantyne

[11] 4,022,099
[45] May 10, 1977

[54] THREADED FASTENER WITH REUSABLE THREAD FORMING PILOT TIP

[75] Inventor: David B. Ballantyne, Southfield, Mich.

[73] Assignee: General Motors Corporation, Detroit, Mich.

[22] Filed: Feb. 6, 1976

[21] Appl. No.: 655,725

[52] U.S. Cl. ............................... 85/1 P; 85/41; 85/46
[51] Int. Cl.² ................................. F16B 35/00
[58] Field of Search ............... 85/1 P, 41, 46, 47; 174/138 D; 403/47, 298, 341

[56] References Cited
UNITED STATES PATENTS

| | | | |
|---|---|---|---|
| 793,690 | 7/1905 | Snyder | 403/341 X |
| 1,447,056 | 2/1923 | Bates | 85/46 X |
| 2,292,102 | 8/1942 | Cluett | 85/1 P |
| 2,783,809 | 3/1957 | Haines | 403/47 X |
| 2,993,950 | 7/1961 | Forman | 85/46 X |

FOREIGN PATENTS OR APPLICATIONS 585,887  2/1947  United Kingdom ............... 85/1 P

*Primary Examiner*—Roy D. Frazier
*Assistant Examiner*—Rodney H. Bonck
*Attorney, Agent, or Firm*—Arthur N. Krein

[57] ABSTRACT

A threaded fastener, such as a bolt or a screw, is releasably secured at its shank end in driving relation with a separate hardened thread forming pilot tip whereby during assembly of the threaded fastener into an unthreaded hole in a member, the threaded fastener is power driven to drive the pilot tip which forms threads in the hole into which the threaded fastener follows, the threaded fastener being free to slide axially relative to the pilot tip whereby to attain thread alignment with the threads in the hole before engagement therewith. After the pilot tip exits from the hole, it is removed from this fastener for use with another fastener.

3 Claims, 5 Drawing Figures

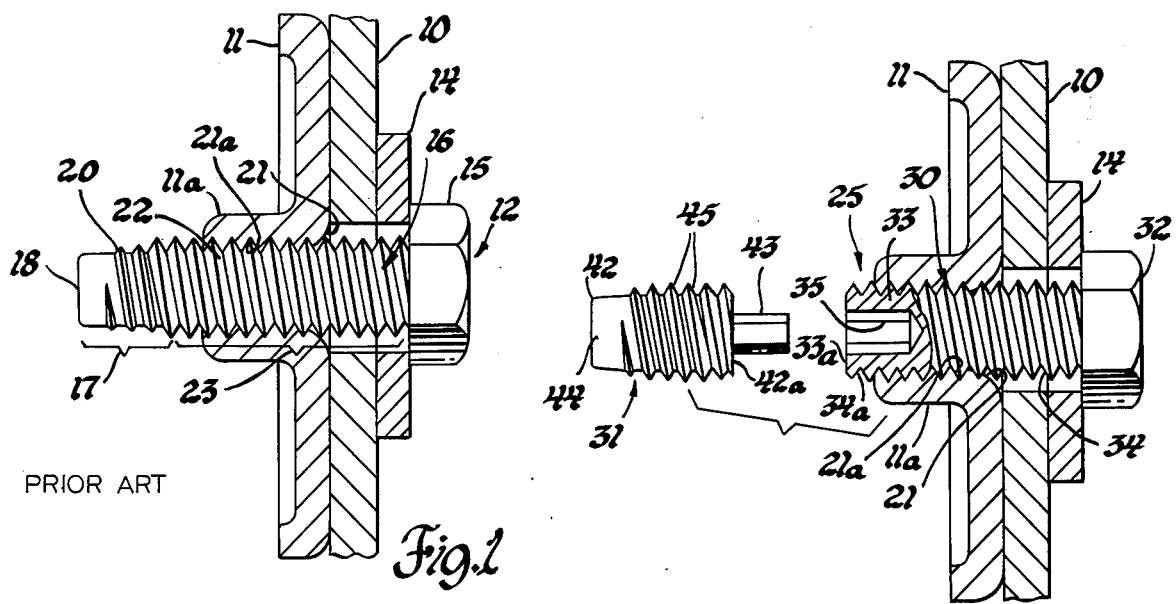
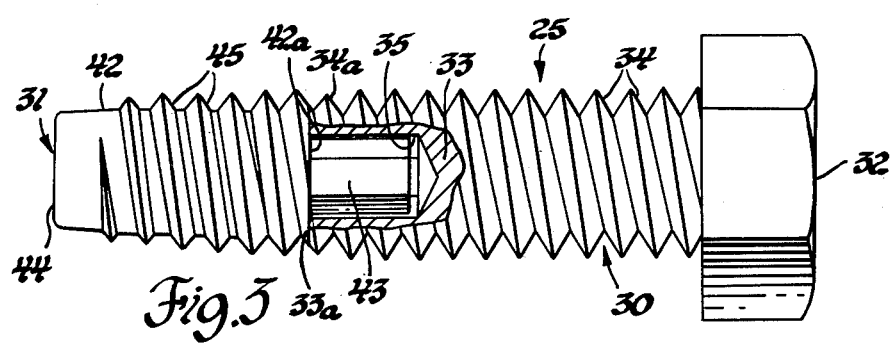
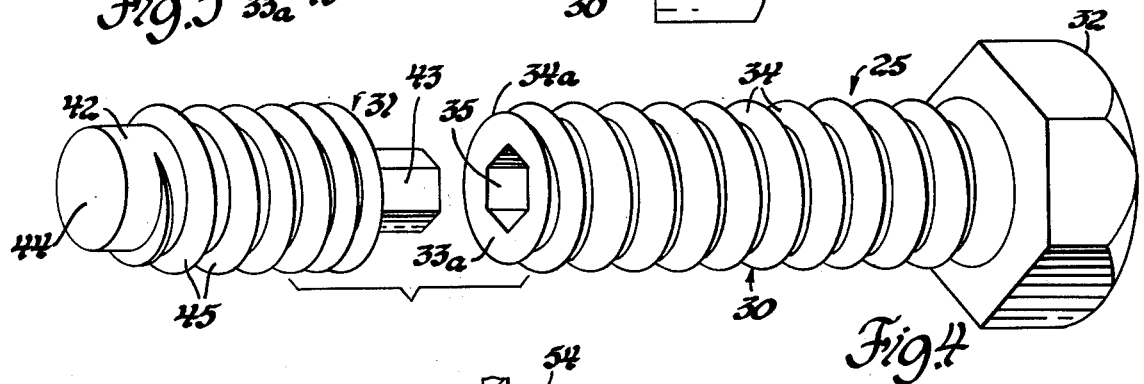
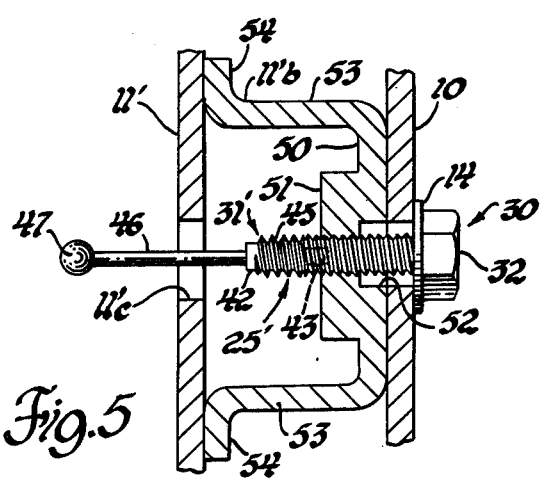

THREADED FASTENER WITH REUSABLE THREAD FORMING PILOT TIP

This invention relates to a self-tapping or thread forming fastener and, in particular, to such a fastener with reusable thread forming pilot tip.

Conventional self-taping or thread forming fasteners, such as self-tapping or thread forming screws and bolts, are well known and such screws or bolts include a drive head with a shank extending therefrom, the shank normally having a tapering free end portion or pilot tip provided with thread cutting or thread forming threads thereon whereby to effect threading of a previously unthreaded hole or opening in a support member, the shank further having a standard threaded portion next adjacent to the head of a predetermined desired axial length, which is a continuation of the threads of the tip, to effect threaded engagement with the now threaded hole in the support member. In such a threaded fastener when used with materials such as steel, it is normal to have at least the tapering free end portion or pilot tip of such a fastener hardened whereby it can effect thread cutting or thread swaging of threads in a previously un-tapped hole in such material.

Obviously for a given application, such a self-tapping or thread forming screw or bolt is always of an axial length greater than that of a corresponding conventional screw or bolt used in the same type of application for securing elements together, the latter, of course, being used with a previously threaded hole. This is due to the fact that the self-tapping or thread forming screw or bolt must be of sufficient length to first permit threading of the hole in the support member and then permit engagement of the standard thread portion thereof with the then threaded hole in the support member, since this is the portion of this type fastener which is actually used to effect the fastening together of elements. In such an application, the pilot tip will normally extend beyond the actual threaded hole in the member. Because of this, it will be apparent that self-tapping or thread forming screws and bolts are more expensive than conventional screws or bolts because of the extra material used in such self-tapping or thread forming fasteners and because of the normal need for hardening of at least the thread forming pilot tip thereof when used to form threads in a material such as steel.

Although it has been suggested in the prior art, as disclosed in U.S. Pat. No. 2,993,950 entitled "Self-Tapping Non-Conductive Fastener" issued July 25, 1961 to Benjamin G. Forman, to make a threaded fastener with a separate thread forming pilot tip secured thereto to be driven thereby. However, this type of fastener, since it was specifically designed for use as a non-conductive fastener with a plastic body, has not found general application in other fields. This non-general use may be due in part to the fact that, in the type fastener disclosed in the above identified U.S. Pat. No. 2,993,950, it is necessary that the two pieces of this fastener be butted together for thread alignment with proper indexing, as necessary, of the pilot tip relative to the screw or bolt to provide thread continuity between the threads of the pilot tip with the threads of the screw or bolt.

It is therefore a primary object of this invention to provide a self-tapping or thread forming fastener which includes a threaded fastener and a reusable thread forming pilot tip releasably secured in driven relation thereto and slidable axially relative thereto.

Another object of this invention is to provide a self-tapping or thread forming screw or bolt with a reusable self-tapping or thread forming pilot tip in driven engagement therewith, the screw or bolt being free to slide axially relative to the pilot tip so that the threads on the screw or bolt can be automatically aligned with the threads formed by the pilot tip during driving of the fastener.

A further object of this invention is to provide self-tapping or thread forming screws or bolts that are low in cost as compared to conventional self-tapping or thread forming screws and bolts by utilizing a detachable and reusable thread forming pilot tip with conventional size screw or bolt.

These and other objects of the invention are obtained by a metal threaded fastener, such as a screw or bolt, having the usual head with a threaded shank extending therefrom, the shank, in the preferred embodiment, being provided with a suitable drive socket to receive a complementary-shaped driven plug provided on one end of a thread forming pilot tip, the pilot tip being provided with either self-tapping or thread forming threads on the outer periphery thereof as desired for threading a previously un-tapped hole in a support member into which the threads on the shank of the screw or bolt can then be engaged, the driven plug being slidale in the drive socket whereby the screw or bolt can move axially relative to the pilot tip so as to effect thread alignment with the threads previously formed in a hole by the pilot tip as these threads are being formed in the hole by the pilot tip.

For a better understanding of the invention, as well as other objects and further features thereof, reference is had to the following detailed description of the invention to be read in connection with the accompanying drawings, wherein:

FIG. 1 is a sectional view of an element secured to a support member by a conventional prior art thread forming screw;

FIG. 2 is a view corresponding to FIG. 1, but showing the element secured to a support member by a threaded fastener with reusable thread forming pilot tip in accordance with the invention, the two elements of this threaded fastener being shown in exploded view;

FIG. 3 is an elevational view of the assembled threaded fastener of FIG. 2, with parts broken away to show the drive connection between the screw and the pilot tip of the threaded fastener;

FIG. 4 is an exploded perspective view of the threaded fastener of FIG. 3; and,

FIG. 5 is a view of an alternate embodiment of the threaded fastener of the invention as used with a boxed assembly.

Referring first to FIG. 1, there is illustrated a first member 10 secured to a support member 11 by a conventional thread forming fastener, such as thread forming screw 12, a washer 14 being sandwiched between the first member 10 and the head 15 of this screw. The thread forming screw 12 includes a shank 16 extending from the head 15, the shank having a free end portion or pilot tip 17 which tapers away from the head 15 toward a leading end 18 of the screw. A thread 20, on the tapering end portion 17, is adapted to form an internal thread in the hole 21 in the extruded nut portion 11a in the support member 11 in a normal manner, it being realized that prior to insertion of the screw therein, the hole would not be threaded. Once an internal thread 21a has been formed by the thread 20, this internal thread 21a is engaged by the standard thread 22 formed on the cylindrical portion 23 of the shank 16. As is well known, the thread 22 can be any size standard thread and the thread 20 on the tapered end portion 17 would be formed as a continuation of this thread, but would have either a self-tapping or thread cutting configuration, or as shown, a threading forming or thread swaging configuration. In addition, if the support member 11 is made of a relatively hard material, such as steel, at least the thread forming tapered tip portion 17 of such a screw would normally be suitably hardened whereby the internal threads in the hole of the support member 11 can be readily formed.

Referring now to the subject matter of this invention, there is illustrated in FIGS. 2, 3 and 4 a threaded fastener with reusable thread forming pilot tip, generally designated 25, in accordance with a preferred embodiment of the invention. As shown in these figures, the threaded fastener with reusable thread forming pilot tip 25 is a two-piece unit which includes an externally threaded metal fastener, such as screw or bolt 30, hereinafter referred to as screw 30, and a detachable thread forming pilot tip 31 also of suitable metal, with suitable means being provided, as hereinafter described, to releasably secure the thread forming pilot tip 31 onto the screw 30 whereby the pilot tip can be driven by the screw while at the same time permitting the screw 30 to move axially relative to the pilot tip 31.

The screw 30, as is conventional, includes a head 32 with a straight cylindrical shank 33 extending therefrom, the shank having external threads 34 thereon, which threads may be any size, well known, standard thread, as desired. To effect driving connection between this screw and the thread forming pilot tip 31, in the embodiment illustrated the shank 33 of the screw is provided with an elongated drive socket 35, of suitable polygon configuration, such as the hex socket configuration shown, this drive socket extending from the free end of the shank a predetermined axial length, for a purpose which will become apparent.

The thread forming pilot tip 31 includes at one end thereof a tapered end portion 42 and at its other end an elongated driven plug 43 formed complementary to the drive socket 35 in screw 30, this driven plug thus being hex-shaped, in the embodiment shown, and is positioned to be concentric with the tapered end portion 42. As best seen in FIGS. 2 and 3, the enlarged end or trailing end of the tapered end portion 42 next adjacent to the driven plug 43 has a major diameter, as provided by the threads 45 thereon, corrresponding to the major diameter of the threads 34 on the shank 33 of screw 30 and, preferably, it has a planar radial inboard end surface 42a for abutment against the planar end surface 33a of the shank of screw 30. The leading end 44 of the tapered end portion 42 is of a diameter less than or equal to the minor diameter of the threads 34 of screw 30, this first diameter on the tapered end portion depending of course on whether the threads 34 on the tapered end portion of the pilot tip 31 are of a thread cutting configuration, or whether they are of a thread forming or swaging configuration. In addition, the outer peripheral surface of the driven plug 43 of the pilot tip should be dimensioned so as to be slidably received loosely within the drive socket 35 of the screw but, at all times, it should be adapted to be in driven engagement therewith. Of course, the threads 45 on the pilot tip 31 would be of a size to form internal threads in the hole 21 of the support member that are complementary to the threads 34 of the screw 30.

Although the pilot tip 31, as shown in FIG. 3, is shown as being abutted against the screw 30 with the threads 34 of the screw aligned with the threads 45 on the pilot tip, in actual use, it is not necessary to index the pilot tip relative to the screw to effect thread alignment because, in accordance with the subject invention, the pilot tip 31, athough connected to the screw 30, whereby to be driven or rotated thereby, is free to move axially relative thereto. Actually, in accordance with the subject invention, neither thread alignment, nor abutment, nor indexing of the pilot tip 31 relative to the screw 30 is necessary because the screw 30 is allowed to slide on the driven plug 43 of the pilot tip 31. Thus, when this threaded fastener is driven into a previously unthreaded hole 21 in a support member 11, as the pilot tip 31 forms threads therein with the screw 30 then following the pilot tip 31, even though the thread forms on the pilot tip 31 and screw 30 are not continuous, within one pitch (one revolution) of the screw 30, the threads 45 of the pilot tip 31 and the threads 34 of the screw will be, in effect, in the same helical path even though there may be a gap between the pilot tip 31 and the screw 30.

For this reason, the first or leading thread 34a of the thread 34 on the screw are, preferably, similar to conventional type screws and bolts in that they are smaller in diameter than the main body thread 34 in order to provide guidance to easily enter an internally threaded aperture and to become axially orientated therewith before actual thread alignment and engagement occurs. It should be noted that all conventional bolts and screws spin on the initial nut thread flank until helical alignment occurs at which time threading begins. Generally, under normal operator push effort, this spinning of the bolt or screw is normally one revolution or less.

In use, the threaded fastener with reusable thread forming pilot tip, designated 25, may be installed into an un-tapped opening in a nut body, such as hole 21 in support member 11, in the normal manner, a suitable tool being engaged with the head 32 of the screw 30 whereby the pilot tip 31 can be rotated to form the internal threads 21a in the internal anular wall provided in the nut body. The lead internal threads in the hole 21 are completely formed before the lead threads 34a of the screw 30 enter this hole. Although these lead threads 34a of the screw 30 may not be aligned with the threads of the pilot tip 31, this is immaterial since with a predetermined clearance between the driven plug 43 and the drive socket 35, the screw 30 will be able to move axially relative to the pilot tip 31. Thus, when these elements are driven into the hole 21 in the support member the screw 30 can hesitate in its axial movement into the now threaded hole 21 while at the same time rotating in order to "find" (align) its lead threads 34a with the internal threads 21a formed in the support member. Therefore, under normal operator push effort, the threads 34 of the screw 30 should automatically synchronize with the internal threads 21a in the support member formed by the pilot tip within one pitch (revolution).

As an example, a 1/2-13 size screw will mate with a nut, such as provided by threads in hole 21 in support member 11, under normal operator push within a slidable distance of 0.077 inch (one pitch). If the drive plug 43 of the pilot tip 31 is, for example, 0.400 inch long, with a drive socket 35 of comparable length, then a 0.323 inch engageable length remains in the drive socket 35 for transmitting torque from the screw 30 to the pilot tip 31 and this is more than ample to effect thread forming of internal threads within the hole 21 in the support member. In fact, if the screw 30 makes two or three revolutions before it finds the internal threads in the support member 11, there would still be sufficient torque coupling from the screw 30 through the drive plug 43 to the pilot tip 31. For example, if the screw 30 hesitates in its axial movement three revolutions, this means that the pilot tip 31, which cannot hesitate because it is rotating and forming threads in the hole 21 of the support member 11, will have progressed ahead of the screw 30 approximately 0.230 inch. This would leave 0.170 inch of drive plug engagement and if the drive plug is 5/16 inch across flats hexagon, for example, then it is still possible to transmit a typical thread forming torque of, for example, 20 ft.lbs. through this plug and socket arrangement to the pilot tip. Thus, it will be seen that in the disclosed threaded fastener with reusable thread forming pilot tip, there is provided means for automatic thread synchronization of the threads 34 of the screw, even while it is still coupled to drive the pilot tip.

Upon completion of the tightening of the screw 30 within the now tapped opening in the support member 11, the tool used to effect rotation of the screw can be removed and the pilot tip 31 can now be removed from this screw and inserted into another screw, not shown.

For use in the boxed construction shown in FIG. 5, an alternate embodiment of the subject threaded fastener with reusable thread forming pilot tip is used to secure the member 10 to the boxed assembly 11'b on the support member 11'. For purposes of illustration only, the boxed assembly 11'b on the support member 11' includes an anchor base 50 having an enlarged nut portion 51 with a stepped hole 52 therethrough, the anchor base 50 being formed integral with a pair of spaced apart legs 53 extending at right angle to the base, with each of the legs terminating in a flange 54 fixed in a suitable manner, as by welding, to the support member 11'. The anchor base 50 is thus supported in fixed spaced apart parallel relation to the support member 11' with the hole 52 therein axially aligned with the aperture 11'c in the support member 11'.

In this alernate embodiment, the threaded fastener wth reusable thread forming pilot tip, generally designated 25', also includes a screw 30 and a pilot tip 31'. The screw may be identical to the screw 30 previously described with reference to FIGS. 2, 3 and 4. However, the pilot tip 31' in addition to including the tapered tip portion 42 and the drive plug 43 also includes a retriever rod 46, of a predetermined desired length, integral with the tapered end portion, or fixed thereto, to extend axially outward from the leading end of the tapered end portion 42. The free end of the retriever rod 46 may be provided with a suitable gripping portion, such as the ball-shaped gripping portion 47 shown. With this arrangement, after this fastener is driven to the position shown in FIG. 5, an operator can then reach around to grasp the retriever rod 46 whereby to disengage the pilot tip 31' from the screw 30 so that it may be used again with another such screw.

Althoughthe threads 45 on the pilot tips 31 and 31' have been illustrated as thread forming or thread swaging type threads, it should be realized that any type thread forming or swaging configuration can be used or any thread cutting configuration can be used without departing from the scope of the subject invention, since such thread forms are well known in the prior art. Accordingly, the terms self-tapping or thread forming are considered to define either thread cutting or thread swaging. Furthermore, as is well known in the art, pilot tip may also be provided with a drill tip, not shown, since such drill tips are well known in the art.

In addition, although in the construction shown, the drive socket 35 is provided in the construction shown, the drive socket 35 is provided in the screw 30 while the driven plug 43 is provided on the pilot tip 31 or pilot tip 31', it should be realized that these elements can be reversed, that is, by providing the plug on the screw and providing the socket in the pilot tip, and also the configuration of the socket and plug could be modified as desired without departing from the scope of the invention.

It should also be realized that, although the head 32 of the screw 30 has been illustrated as being an external wrenching type head in the form of a hex head, any suitable internal or external wrenching head may be used on the screw.

What is claimed is:

1. In a two-piece self-tapping threaded fastener of the type having a screw and a separate thread forming pilot tip, said screw having a head and a threaded shank extending therefrom, said threaded shank having an internal wrenching socket therein extending from its free end, said thread forming pilot tip including a tapered end portion with thread forming threads thereon and a coaxial extending driven plug adapted to be engaged in said socket, the improvement wherein said threaded shank is of reduced diameter at its free end providing reduced diameter lead threads thereon and wherein said driven plug is loosely slidable in driven engagement in said socket whereby said pilot tip can move axially relative to said shank of said screw to permit said screw to hesitate in its axial movement during driving of the fastener whereby to permit said lead threads of said shank to attain helical thread alignment with the threads formed by said thread forming pilot tip in a previously unthreaded nut blank before threaded engagement of said screw therein begins.

2. In combination, a metal fastener having a head with a shank extending therefrom, said shank having a standard thread convolution thereon with said shank being of reduced diameter at its free end whereby said thread convolution provides lead threads at said free end, said shank further having a longitudinal drive socket therein extending from its free end concentric with said thread convolution and, a reusable thread forming pilot tip, said thread forming pilot tip including a tapered end portion having a thread forming convolution thereon for forming a mating internal thread in the internal wall of a nut blank means for said thread convolution on said shank, said thread forming pilot top further hving an axial extending driven plug extending from the large end of said tapered end portion, said driven plug being of complementary shape to said drive socket and loosely slidably receivable in said socket to be in driven engagement thereby and to provide thread alignment means so that said thread forming pilot tip can move axially relative to said shank of said metal fastener whereby to permit said metal fastener to hesitate in its axial movement during driving of said metal fastener and said pilot tip by said metal fastener so as to permit said lead threads on said shank to attain helical thread alignment with the threads formed by said thread forming pilot tip in said nut blank before threaded engagement of said thread convolution in said metal fastener therein begins, said thread forming pilot tip then being removable from said metal fastener for resue with another metal fastener.

3. In combination, a metal fastener having a head with a shank extending therefrom, said shank having a standard thread convolution thereon with said shank being of reduced diameter at its free end whereby said thread convolution provides lead threads at said free end and, a reusable thread forming pilot tip, said thread forming pilot tip including a tapered end portion having a thread forming convolution thereon for forming a mating internal thread for said thread convolution on said shank in the internal wall of a nut blank means, said shank of said metal fastener and said thread forming pilot tip having thread alignment means associated therewith including cooperating wrenching socket and plug means associated and integral therewith, with said plug means being loosely slidably received in said socket means whereby said thread forming pilot tip can be coupled in driven relationship to said shank of said metal fastener to form a removable driven extension thereof and whereby said thread forming pilot tip can move axially relative to said shank of said metal fastener to permit said metal fastener to hesitate in its axial movement during driving of said metal fastener and said pilot tip whereby to permit said lead threads on said shank to attain helical thread alignment with said threads formed by said thread forming pilot tip in said nut blank before threaded engagement of said thread convolution on said shank begins therein.

* * * * *

UNITED STATES PATENT AND TRADEMARK OFFICE
CERTIFICATE OF CORRECTION

PATENT NO. : 4,022,099
DATED : May 10, 1977
INVENTOR(S) : David B. Ballantyne

It is certified that error appears in the above-identified patent and that said Letters Patent are hereby corrected as shown below:

Column 4, line 45 "anular" should read --annular--.
Column 5, line 7 "finds" should read --"finds"--;
line 66, "Althoughthe" should read --Although the--.
Column 6, line 11 "provided in the construction shown, the drive socket 35 is provided in" should read --provided in--;
line 58 "pilot top" should read --pilot tip--.

Signed and Sealed this

Twentieth Day of September 1977

[SEAL]

Attest:

RUTH C. MASON
Attesting Officer

LUTRELLE F. PARKER
Acting Commissioner of Patents and Trademarks